(12) United States Patent
Reddipalli et al.

(10) Patent No.: US 10,990,090 B2
(45) Date of Patent: *Apr. 27, 2021

(54) APPARATUS AND METHOD FOR AUTOMATIC DETECTION AND CLASSIFICATION OF INDUSTRIAL ALARMS

(71) Applicant: General Electric Company, Schenectady, NY (US)

(72) Inventors: Veera Kishore Reddipalli, San Ramon, CA (US); Vamshi Gandrapu, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,729

(22) Filed: Jan. 13, 2020

(65) Prior Publication Data

US 2020/0150641 A1 May 14, 2020

Related U.S. Application Data

(63) Continuation of application No. 15/819,496, filed on Nov. 21, 2017, now Pat. No. 10,534,360.

(51) Int. Cl.
G05B 23/02 (2006.01)
H04L 29/08 (2006.01)

(52) U.S. Cl.
CPC .......... *G05B 23/0272* (2013.01); *H04L 67/10* (2013.01)

(58) Field of Classification Search
CPC ........................... G05B 23/0272; H04L 67/10
USPC ......................................................... 340/679
See application file for complete search history.

(56) References Cited

U.S. PATENT DOCUMENTS

| | | | |
|---|---|---|---|
| 9,792,434 B1 | 10/2017 | Li | |
| 10,037,128 B2 | 7/2018 | Mehta | |
| 10,237,290 B2 | 3/2019 | Balakrishnan | |
| 10,534,360 B2 | 1/2020 | Reddipalli | |
| 10,539,936 B2 * | 1/2020 | Nixon | H04L 41/06 |
| 10,656,805 B2 * | 5/2020 | Mehta | G05B 23/0272 |
| 2018/0107178 A1 | 4/2018 | Nixon | |

* cited by examiner

*Primary Examiner* — John A Tweel, Jr.
(74) *Attorney, Agent, or Firm* — Fitch Even Tabin & Flannery LLP

(57) ABSTRACT

An occurrence of a predetermined event is detected within a stream of data and a classification for the event is determined. A message is sent to an application when the predetermined event is detected. The message is received at the application and the message is visualized to a user of the application. The stream of data from the industrial machine to the transceiver circuit, to the control circuit, and to the application occurs in real-time without substantial interruption allowing the user of the application to make decisions and determine insights concerning the industrial machine in real-time.

16 Claims, 3 Drawing Sheets

APPARATUS AND METHOD FOR AUTOMATIC DETECTION AND CLASSIFICATION OF INDUSTRIAL ALARMS

CROSS REFERENCE TO RELATED APPLICATION

The present application is a continuation of and claims the benefit of U.S. application Ser. No. 15/819,496, filed on Nov. 21, 2017, now U.S. patent Ser. No. 10/534,360, which is incorporated herein by reference in its entirety.

FIELD OF THE INVENTION

The subject matter disclosed herein generally relates to the automatic detection and classification of alarms (or other events), and, more specifically, to the automatic detection and classification of industrial alarms (or other events) in a stream of industrial asset data, and to streaming the results in real-time (or near real-time) to interested parties for visualization.

BACKGROUND

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MM systems) for use in patient care facilities, or drilling equipment for use in mining operations. Other types of industrial assets may include vehicles such as fleets of trucks. The design and implementation of these assets often takes into account both the physics of the task at hand, as well as the environment in which such assets are configured to operate.

Industrial equipment or assets produce various types of data. For example, the assets may acquire temperature, pressure, speed, or other types of physical parameters. In addition, the assets may report alarms or alarm conditions that are sensed or created. In aspects, alarms may be created when the asset is not operating properly or may be on the verge of not operating properly.

In current approaches, multiple systems and partitions (both hardware and software) exist. These multiple systems and partitions prevent alerting users in real-time to events as the events occur. Consequently, real-time observations and insights were not possible or were very difficult to achieve.

BRIEF DESCRIPTION OF THE INVENTION

In the present invention, patterns for alarms (or other events) are identified in near real time by processing the stream(s) of industrial asset data and classifying them with the category, criticality, probability or likeliness of the alarms. The alarm detection results are streamed in real-time for visualization and will enable the users to make necessary decisions with real-time insights.

This invention applies machine learning approaches to predict and forecast likely occurrences of an alarm and the alarm's category and criticality, based upon current stream of data in combination of historical data, and other knowledge base. For example, while the sensor data is being received for an equipment A in real-time, the invention applies historical teachings and information from other equipment similar to equipment A to the incoming data. Given similar operating conditions between equipment A and the historical data, the approaches described herein predict the occurrence of an alarm (or other event) as a foresight. Such predicted alarms are delivered to appropriate personnel as, for instance, push notifications for further visual analysis. Thus, alarms are predicted or forecast from an evaluation of real-time, streaming data, historical data, and/or other types of data. By "machine learning," it is meant that well-defined software algorithm(s) are trained and can continuously learn from new kinds or types of data, and are system executable.

In many of these embodiments, a continuous stream of data is received from an industrial machine at a transceiver circuit. The stream of data is then obtained in real-time from the transceiver circuit at a control circuit.

At the control circuit, an occurrence of a predetermined event is detected or predicted within the stream of data and a classification for the event is determined. A message is sent from the control circuit to an application when the predetermined event is detected or predicted. The content of the message is based upon the classification. The message is received at the application and the message is visualized to a user of the application.

The stream of data from the industrial machine to the transceiver circuit, to the control circuit, and to the application occurs in real-time (or near-real-time) without substantial interruption allowing the user of the application to make decisions and determine insights concerning the industrial machine in real-time (or near real-time).

In aspects, the classification relates to an event type, criticality of the event, or probability of the event. Other examples of classifications are possible. In examples, the event is an alarm. Other examples of events are possible.

In other aspects, the application is disposed on a mobile device. In examples, the mobile device is a smart phone, a personal computer, a laptop, or a tablet. Other examples are possible.

In other examples, the industrial machine is deployed in a power plant, a wind farm, an industrial plant, a school, or a business. The industrial machine may be disposed at other locations as well.

In yet other aspects, the data is or includes at least some time series data. For example, the data may include temperature, pressure, or speed information concerning the industrial machine.

In some other examples, the control circuit is disposed at the cloud and remotely from the industrial machine. The control circuit may also be disposed locally, at the site of the industrial machine.

In others of these embodiments, a system with continuous streaming from end-to-end includes an industrial machine, a transceiver circuit, a control circuit, and an application. The industrial machine provides or creates a continuous stream of data. The transceiver circuit is coupled to the industrial machine and is configured to receive the continuous stream of data from the industrial machine.

The control circuit is coupled to the transceiver circuit, and is configured to continuously receive the data in real-time (or near real-time). The control circuit is configured to detect or predict an occurrence of a predetermined event within the data and determine a classification for the event. The control circuit is configured to send a message to an application when the predetermined event is detected or predicted. The content of the message is based upon the classification.

The application is coupled to the control circuit. The application is configured to receive the message and visualize the message to a user of the application.

The stream of data from the industrial machine to the transceiver circuit, then to the control circuit, and then to the application occurs in real-time (or near real-time) without substantial interruption allowing the user of the application to make decisions and determine insights concerning the industrial machine in real-time (or near real-time).

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, a software platform allows end-to-end, and continuous streaming of data (from obtaining the data at a machine, reception of the data at a platform, through analytics processing the data at the platform, to sending alerts to users).

In one example, a machine (e.g., a gas turbine) sends data to a software platform on the cloud. The platform is running an analytic. An application (app) notifies a user of events (e.g., alarms). Data constantly and seamlessly streams from the machine, and to the platform. The analytic constantly monitors the data for certain events (e.g., the detection of an alarm or an alarm condition). Once detected (in real-time or near real-time), the event (e.g., existence of an alarm) is communicated to the application.

It can be seen that the streaming of data or information is continuous and from end-to-end (e.g., from the machine to the user) in the system. No user intervention is required. The user need do nothing but view the events at the application. It will be appreciated that the present approaches allow the end-to-end and continuous streaming of data (from reception of the data, through analytics processing the data, to sending alerts to users).

Figure 1:
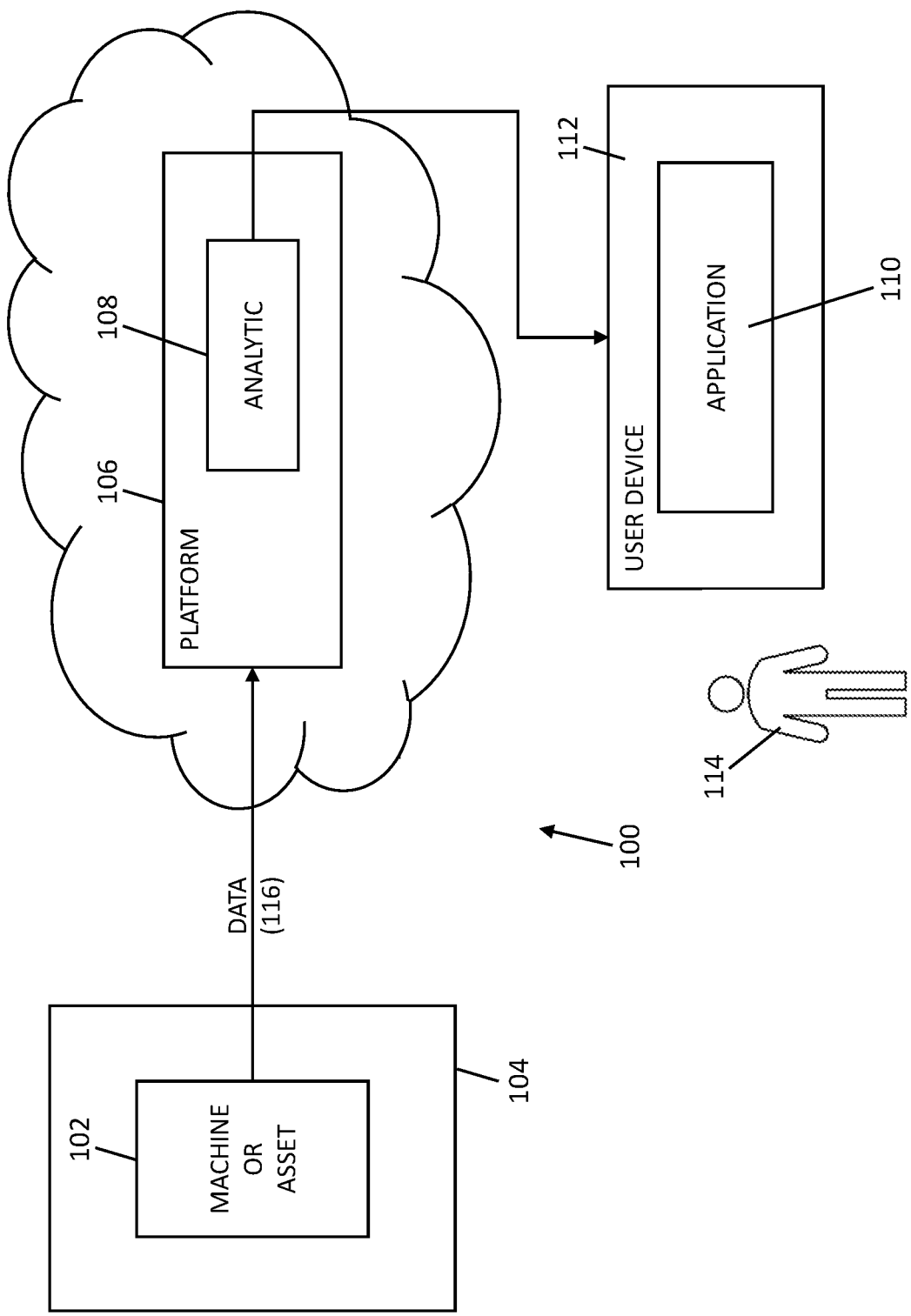
FIG. 1 comprises a block diagram of a system that streams data from one end of a system to another end of a system in real-time (or near real-time) according to various embodiments of the present invention.

Referring now to FIG. 1, one example of a system 100 that streams data from one end of a system to another end of a system in real-time (or near real-time) is described. The system includes an industrial machine or asset 102 (at a site 104), a platform 106 (running an analytic 108), and an application 110 (executed on a user device 112).

The machine or industrial asset 102 may be any type of industrial machine such as manufacturing equipment on a production line, wind turbines that generate electricity on a wind farm, healthcare or imaging devices (e.g., X-ray or MM systems) for use in patient care facilities, or drilling equipment for use in mining operations. Other types of industrial assets may include vehicles such as fleets of trucks. Still other examples of industrial machines are possible. Although a single industrial machine is shown in FIG. 1, it will be appreciated that multiple industrial machines may be utilized.

The site 104 may be any type of site such as a power plant, a wind farm, an industrial plant, a school, or a business. Other examples of sites are possible.

The platform 106 is any of the platform that can be used to execute different functions or support user interaction. In one example, the platform 106 is the Predix™ platform supplied by General Electric. In one example, the platform is implemented as computer instructions executed on a processing device or control circuit.

In an example, the industrial asset 102 can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

The systems and methods for managing industrial assets can include or can be a portion of an Industrial Internet of Things (IIoT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

The analytic 108 may be implemented as computer software and provide any function that analyzes data. For example, the analytic 108 may determine the number of binary zeros and ones in the data. In another example, the analytic is configured to determine whether an alarm exists in the data received from the industrial machine 102.

The application 110 may be computer instructions that are executed on a processing device or control circuit at the user device. The user device 112 may be a smart phone, a personal computer, a laptop, or a tablet. Other examples of user devices are possible.

In one example of the operation of the system of FIG. 1, the machine or asset 102 (e.g., a gas turbine) sends data to the software platform 106 on the cloud. The platform 106 is running an analytic 108. The application 110 notifies a user 114 of events (e.g., alarms) via visualizations on the user device 112. Data 116 constantly and seamlessly streams from the machine 102, and to the platform 106. The analytic 108 constantly monitors the data 116 for certain events (e.g., the detection of an alarm or an alarm condition). Once detected (in real-time or near real-time), the event (e.g., existence of an alarm) is communicated to the application 110.

Machine learning approaches are applied to the data to predict and forecast likely occurrences of an alarm and the alarm's category and criticality. Historical data and information from other knowledge bases can be used as well to make these predictions and forecasts. For example, while the sensor data is being received for an equipment A in real-time, the approaches described herein apply historical teachings and information from other equipment that is similar to equipment A. Given similar operating conditions, the approaches described herein predict the occurrence of an alarm as a foresight. Such predicted alarms are delivered to appropriate personnel as push notifications for further analysis visually. Not only is an alarm predicted, but the criticality level (e.g., severe) or category (e.g., indicated by abstraction notions that are equipment-based or process-based typically such as "over_pressure_equipment1001") can also be determined.

For example, incoming streaming sensor data may indicate a certain set of conditions for or operation of equipment A. Comparing historical data (e.g., stored in a database) of similar equipment to the incoming streaming data may indicate that an alarm for an over-pressure condition is likely (e.g., the incoming data may match historical data where over-pressure alarms occurred for similar pieces of equipment). Thus, an alarm at equipment A may be predicted. The streaming data may also indicate the severity of the alarm. All of this information can be rendered visually to a user or technician so that steps can be taken (e.g., repair equipment A).

Visualizations may show the alarm, identification information concerning the machine or asset where the alarm is occurring, and possible response strategies or actions that can be taken by a user.

It can be seen that the streaming of data or information is continuous and from end-to-end (e.g., from the machine 102 to the user 114) in the system 100. No user intervention is required. The user 114 need do nothing but view the events via visualizations provided by the application 110.

It will be understood that as used herein "real-time" means as an event occurs, i.e., the actual time and event or process occurs. "Near real-time" refers to events in real time or nearly in real-time, without significant or meaningful delay that would affect results. For instance, the present approaches provide for near real-time insights and reactions by users so problems at industrial machines are detected by the user immediately or almost immediately. Thus, these problems can be addressed immediately or almost immediately. In so doing, machine or process recovery is expedited and any down time of the machine is minimized.

Figure 2:
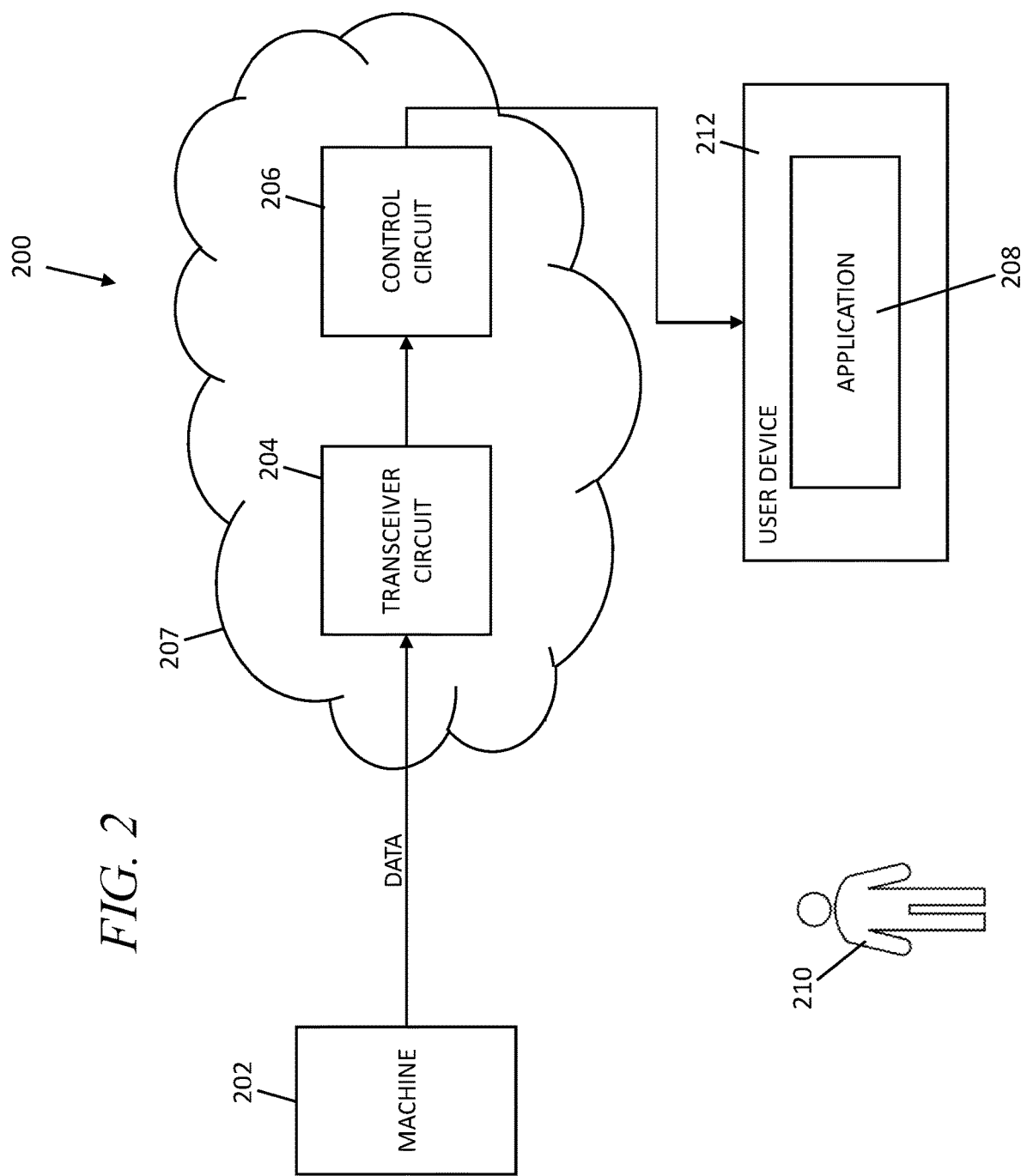
FIG. 2 comprises a block diagram of a system that streams data from one end of a system to another end of a system in real-time (or near real-time) according to various embodiments of the present invention.

Referring now to FIG. 2, one example of another system 200 that streams data from one end of a system to another end of a system in real-time (or near real-time) is described. The system 200 includes an industrial machine 202, a transceiver circuit 204, a control circuit 206, and an application 208.

The industrial machine 202 provides a continuous stream of data. In other examples, the industrial machine 202 is deployed in a power plant, a wind farm, an industrial plant, a school, or a business. The industrial machine may be disposed at other locations as well.

The machine 202 may be any type of industrial machine such as manufacturing equipment on a production line, wind turbines that generate electricity on a wind farm, healthcare or imaging devices (e.g., X-ray or MRI systems) for use in patient care facilities, or drilling equipment for use in mining operations. Other types of machines may include vehicles such as fleets of trucks. Other examples of industrial machines are possible.

The transceiver circuit 204 is coupled to the industrial machine 202 and is configured to receive the continuous stream of data from the industrial machine 202. The data may be in any form or format. In yet other aspects, the data is time series data. For example, the data may include temperature, pressure, or speed information concerning the industrial machine. The transceiver circuit 204 and the control circuit 206 may be disposed at a network 207 (e.g., the cloud or any other type of network).

The application 208 may be computer instructions that are executed on a processing device or control circuit at a user device 212. In examples, the user device 212 is an electronic device such as a smart phone, a personal computer, a laptop, or a tablet. Other examples are possible. A user 210 views the application 208 and visualizations provided by the application 208 at the user device 212.

In some other examples, the control circuit 206 is disposed at the cloud and remotely from the industrial machine. The control circuit 206 may also be disposed locally, at the site of the industrial machine 202.

The control circuit 206 is coupled to the transceiver circuit 204, and is configured to continuously receive the data in real-time. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 206 may be configured (for example, by using corresponding programming stored in a memory as will be well understood by those skilled in the art) to carry out one or more of the steps, actions, and/or functions described herein.

The control circuit 206 is configured to detect an occurrence of a predetermined event within the data and determine a classification for the event. In aspects, the classification is of event type, criticality of the event, or probability of the event. Other examples of classification are possible. In examples, the event is an alarm. Other examples of events are possible. The control circuit 206 may use machine learning approaches to predict or forecast events such as alarms.

The control circuit 206 is configured to send a message to the application 208 when the predetermined event is detected. The content of the message based upon the classification.

The application 208 is coupled to the control circuit 206. The application 208 is configured to receive the message and visualize the message to a user of the application.

The stream of data from the industrial machine 202 to the transceiver circuit 204, then to the control circuit 206, and then to the application 208 occurs in real-time without substantial interruption allowing the user 210 of the application 208 to make decisions and determine insights concerning the industrial machine in real-time. For example, decisions as to when and how to repair or perform maintenance on the machine, or how to alter the operation of the machine to make the machine operate more efficiently can be made.

Figure 3:
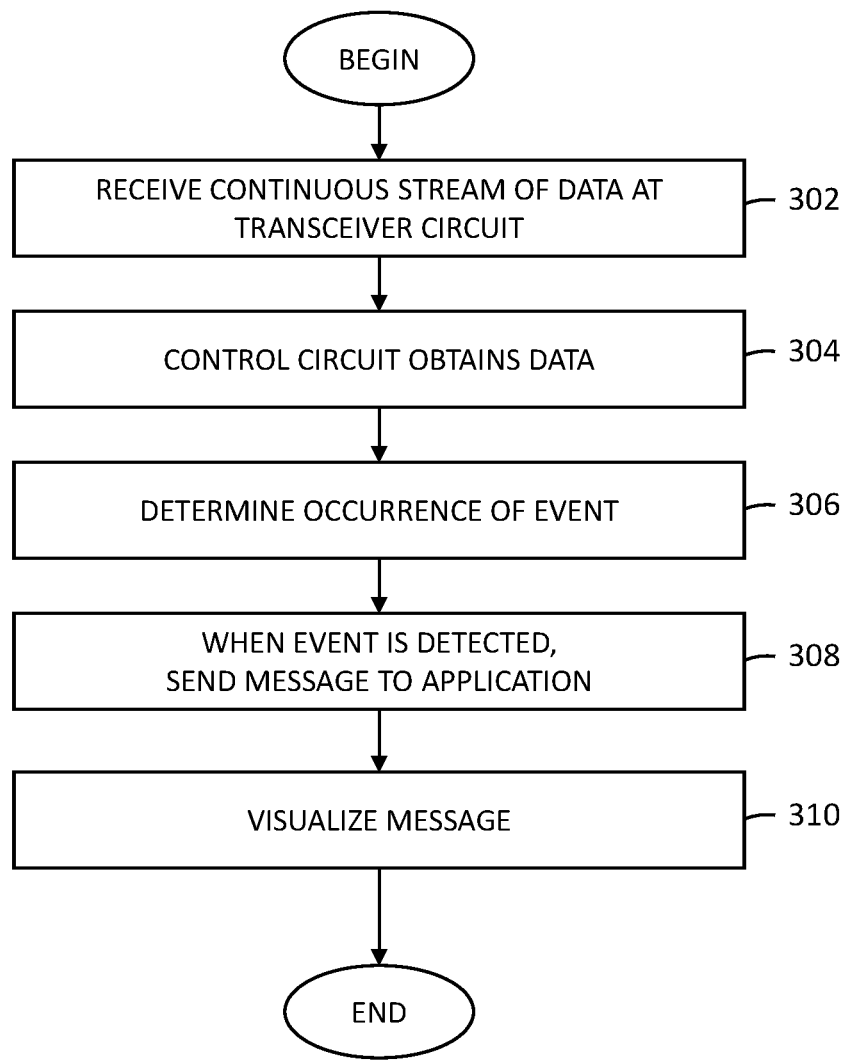
FIG. 3 comprises a flow chart of an approach that streams data from one end of a system to another end of a system in real-time (or near real-time) according to various embodiments of the present invention.

Referring now to FIG. 3, one example of an approach that streams data from one end of a system to another end of a system in real-time (or near real-time) is described.

At step 302, a continuous stream of data is received from an industrial machine at a transceiver circuit (e.g., a transceiver circuit associated with a platform such as the Predix™ platform supplied by General Electric). In examples, the industrial machine is deployed in a power plant, a wind farm, an industrial plant, a school, or a business. The industrial machine may be disposed at other locations as well. In yet other aspects, the data is time series data. For example, the data may include temperature, pressure, or speed information concerning the industrial machine.

At step 304, the stream of data is then obtained in real-time from the transceiver circuit by a control circuit. In some other examples, the control circuit is disposed at the cloud and remotely from the industrial machine. The control circuit may also be disposed locally, at the site of the industrial machine.

At step 306 and at the control circuit, an occurrence of a predetermined event is detected or predicted within the stream of data and a classification for the event is determined. In aspects, the classification is of event type, criticality of the event, or probability of the event. Other examples of classification are possible. In examples, the event is an alarm. Other examples of events are possible.

At step 308, a message is sent from the control circuit to an application when the predetermined event is detected or predicted. The content of the message is based upon the classification. In aspects, the application is disposed on a mobile device. In examples, the mobile device is a smart phone, a personal computer, a laptop, or a tablet. Other examples are possible.

At step 310, the message is received at the application and the message is visualized to a user of the application.

It will be appreciated that the stream of data from the industrial machine to the transceiver circuit, to the control circuit, and to the application occurs in real-time without substantial interruption allowing the user of the application to make decisions and determine insights concerning the industrial machine in real-time or near real-time.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method for the continuous streaming of data from end-to-end in a processing system, the method comprising:
   receiving a continuous stream of data from a machine at a transceiver circuit, sensors at the machine sensing the data;
   continuously obtain the stream of data in real-time from the transceiver circuit at a control circuit;
   at the control circuit, detecting an occurrence of a predetermined event within the stream of data and determining a classification for the event;
   sending a message from the control circuit to an application when the predetermined event is detected, the content of the message based upon the classification;
   receiving the message at the application and visualizing the message to a user of the application;
   wherein the stream of data from the machine to the transceiver circuit, to the control circuit, and to the application occurs in real-time without substantial interruption allowing the user of the application to make decisions and determine insights concerning the machine in real-time.

2. The method of claim 1, wherein the classification is one or more of event type, criticality of the event, or probability of the event.

3. The method of claim 1, wherein the event is an alarm.

4. The method of claim 1, wherein the application is disposed on a mobile device.

5. The method of claim 4, wherein the mobile device is a smart phone, a personal computer, a laptop, or a tablet.

6. The method of claim 1, wherein the machine is deployed in a power plant, a wind farm, an industrial plant, a school, or a business.

7. The method of claim 1, wherein the data is time series data.

8. The method of claim 1, wherein the control circuit is disposed at the cloud and remotely from the machine.

9. A system with continuous streaming from end-to-end, the system comprising:
- a machine that provides a continuous stream of data, sensors at the machine sensing the data;
- a transceiver circuit that is coupled to the machine and configured to receive the continuous stream of data;
- a control circuit coupled to the transceiver circuit, the control circuit configured to continuously receive the data in real-time, the control circuit configured to detect an occurrence of a predetermined event within the data and determine a classification for the event, the control circuit configured to send a message to an application when the predetermined event is detected, the content of the message based upon the classification;
- an application coupled to the control circuit, the application configured to receive the message and visualize the message to a user of the application;

wherein the stream of data from the machine to the transceiver circuit, to the control circuit, and to the application occurs in real-time without substantial interruption allowing the user of the application to make decisions and determine insights concerning the machine in real-time.

10. The system of claim 9, wherein the classification is one or more of event type, criticality of the event, or probability of the event.

11. The system of claim 9, wherein the event is an alarm.

12. The system of claim 9, wherein the application is disposed on a mobile device.

13. The system of claim 12, wherein the mobile device is a smart phone, a personal computer, a laptop, or a tablet.

14. The system of claim 9, wherein the machine is deployed in a power plant, a wind farm, an industrial plant, a school, or a business.

15. The system of claim 9, wherein the data is time series data.

16. The system of claim 9, wherein the control circuit is disposed at the cloud and remotely from the machine.

* * * * *